Jan. 16, 1934.    W. D. FOSTER    1,943,305
FILM HANDLING APPARATUS
Filed April 19, 1929    3 Sheets-Sheet 1
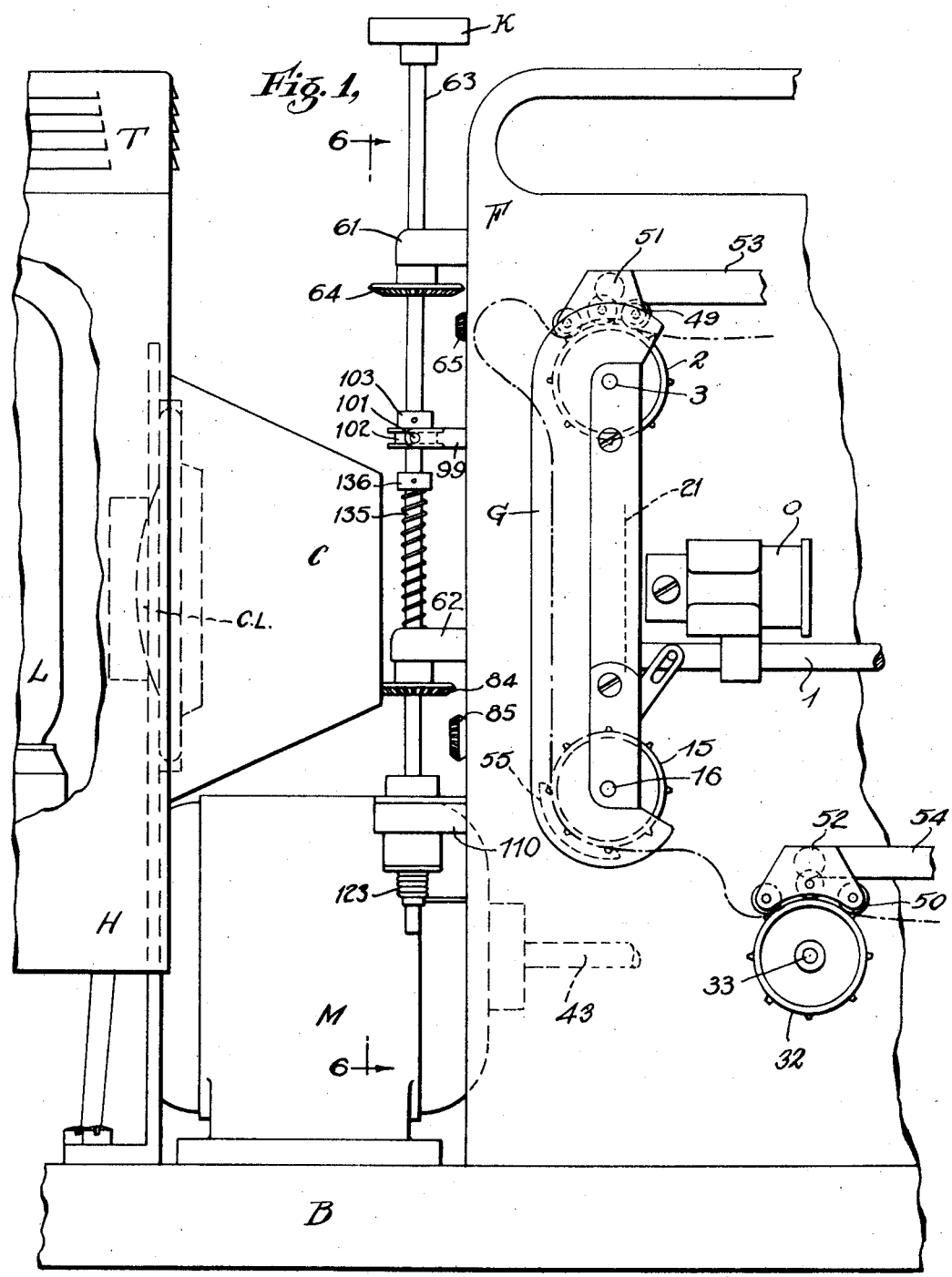
INVENTOR.
W. D. FOSTER
BY Waldo G. Morse
ATTORNEYS.

Jan. 16, 1934.  W. D. FOSTER  1,943,305
FILM HANDLING APPARATUS
Filed April 19, 1929  3 Sheets-Sheet 2
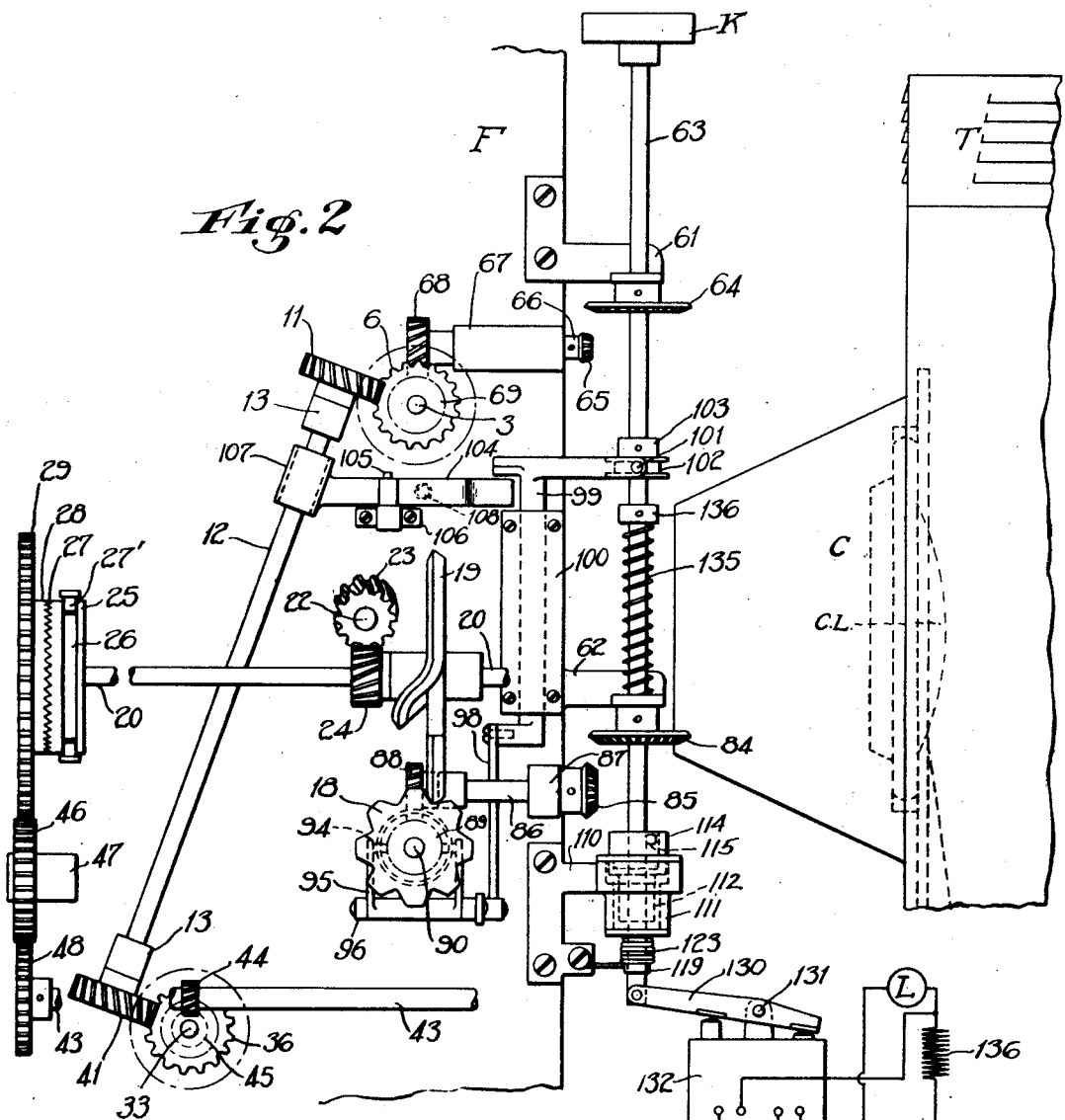
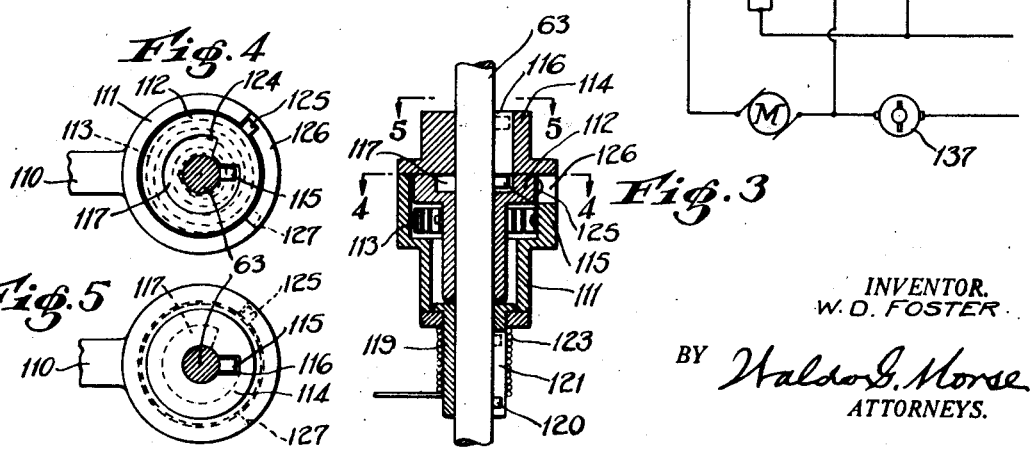
INVENTOR.
W. D. FOSTER
BY Waldo G. Morse
ATTORNEYS.

Jan. 16, 1934.  W. D. FOSTER  1,943,305
FILM HANDLING APPARATUS
Filed April 19, 1929   3 Sheets-Sheet 3
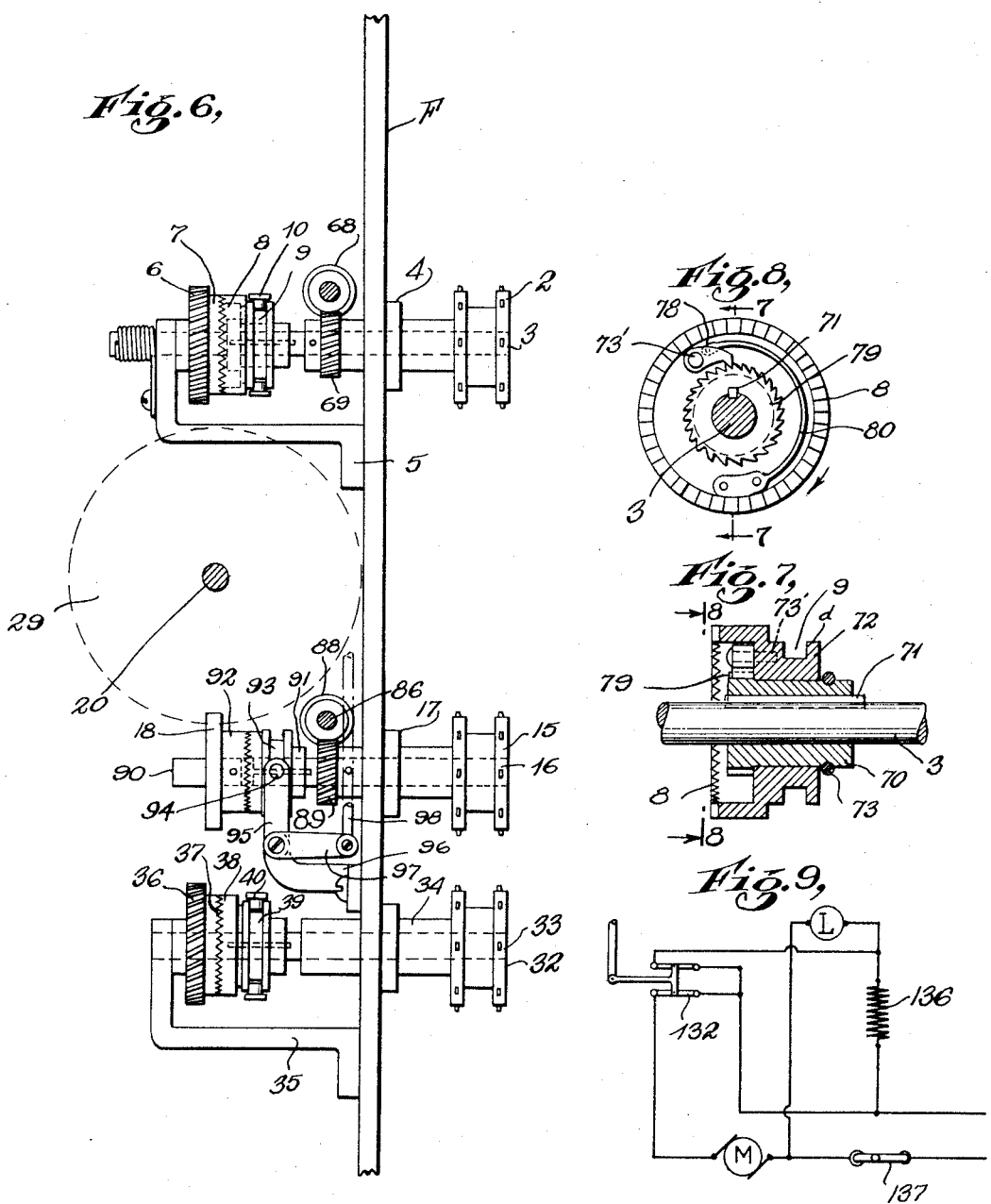
INVENTOR.
W. D. FOSTER
BY Waldo G. Morse
ATTORNEYS.

Patented Jan. 16, 1934

1,943,305

UNITED STATES PATENT OFFICE 1,943,305

FILM HANDLING APPARATUS

Warren Dunham Foster, Washington Township, Bergen County, N. J., assignor to Kinatome Patents Corporation, New York, N. Y., a corporation of New York Application April 19, 1929. Serial No. 356,564

52 Claims. (Cl. 88—18)

The present invention can be applied to any art in which material is fed intermittently, and is particularly useful in connection with film handling, whether the film is utilized for the purpose of recording or reproducing images or symbols. In the following description, my invention is described as applied to the handling of a film in a motion picture projector, but it will be readily understood that it may be advantageously applied to many other uses.

In my co-pending application, Serial Number 347,959, filed March 18, 1929, which is a continuation in part of my application Serial Number 57,392, filed September 19, 1925, and in the application of Frederick Davenport Sweet and myself, Serial Number 352,525, filed April 4, 1929, there are disclosed and claimed method and means for the creation of loops of slack in the film for cooperation with the feeding members of a motion picture apparatus by the successive actuation or operation of the various film feeding members. An object of the present invention is to provide alternative method and means whereby loops of slack film may be initially produced in a film handling apparatus by the concurrent operation of various film handling members, each such member being operated at a different rate of speed and one member preferably being maintained motionless. A further object of the present invention is to provide automatic mechanism for the initial production of a loop of slack in the film which mechanism can be utilized in an apparatus which is relatively cheap to construct. Another object is to provide manually operable mechanism for the automatic production of such loops of film, and interlocked control means for such mechanism and the mechanism for the normal feeding of the film. Further objects include the provision of improved means whereby the heat of the light source reaching the film during the loop producing operation is automatically reduced, and improved means whereby the mechanism adapted for the normal feeding of the film is automatically rendered inoperative prior to and during the loop producing operation. A further object is the provision of means whereby a feeding member which is normally operable intermittently may be operated continuously. A further object is the provision of means whereby various film handling members may be operated concurrently at different rates of speed and whereby one of the same may be locked against any movement whatever. A further object is the provision of means whereby the same film feeding member may be successively operated by different driving mechanisms, and the position of each successive image upon any film fed by such member maintained in a similar relative position to the aperture of the apparatus. A further object is the provision of improved method and means whereby a loop of slack film may be automatically produced in a film handling apparatus.

Other advantages and characteristics are apparent in the following description, the attached drawings, and the subjoined claims. Although I am showing one preferred embodiment of my invention, it will be readily understood that I am not limited to this particular construction as changes can readily be made without departing from the spirit of my invention or the scope of my broader claims.

In the drawings:

Figure 1 is a right hand elevational view of a film handling apparatus, certain parts being omitted for clarity;

Figure 2 is a left hand skeleton view of the same;

Figure 3 is an enlarged detail view of the control mechanism for the loop producing shaft;

Figure 4 is a view taken on the line 4—4 of Figure 3, looking in the direction of the arrows;

Figure 5 is a view taken on the line 5—5 of Figure 3, looking in the direction of the arrows;

Figure 6 is a sectional view taken on the line 6—6 of Figure 1, looking in the direction of the arrows;

Figure 7 is an enlarged detail view taken on the line 7—7 of Figure 8, looking in the direction of the arrows;

Figure 8 is an enlarged detail section view taken on the line 8—8 of Figure 7, looking in the direction of the arrows;

Figure 9 is a wiring diagram of the apparatus.

The present invention may be applied to any desired type of film handling apparatus, such as any of those, for example, which are described in the above mentioned co-pending applications. Such apparatus may include a supporting base B upon which are mounted the motor M, the lamp house H, in which the light source L is provided, and a main frame F, which supports the operating mechanism per se.

Attached to the front of the lamp house H there is a cone C to prevent the escape of objectionable light. The condensing lens CL is mounted in such cone. The top T of the lamp house H may be provided with louvres to permit the escape of heated air.

Mounted upon the main frame F there are the objective lens O, the gate G, and the film feeding members. Such gate may consist of sections one or more of which is movable relatively to another and controlled by a gate opening rod 1, which may be operated in any desired manner, not shown.

The continuous supply sprocket 2 is mounted upon the shaft 3 supported by the bearing 4 attached to the main frame F, the left hand end of such shaft, as viewed in Figure 6, being supported by the bracket 5 likewise attached to the frame F. Mounted for free rotation upon the shaft 3 is the gear 6 to the right hand edge of which, as viewed in Figure 6, are attached the serrated teeth 7 adapted to cooperate with the serrated teeth 8 in the clutch mechanism, later described in detail, mounted upon the shaft 3 for rotation therewith and longitudinal movement relative thereto. Formed in a portion of such clutch mechanism is the groove 9 with which cooperate the clutch fingers 10 by means of which the teeth 8 may be moved into and out of cooperative relation with the gear 6. Such gear 6 is operated by a suitable gear 11 pinned to the upward end of a shaft 12 which is suitably supported as by the bearings 13 attached to the main frame F.

The intermittently operable sprocket 15 is mounted upon the shaft 16 which is supported by the bearing 17 attached to the main frame F. In order to drive the sprocket 15 intermittently, the star wheel 18 is provided and cooperates with the sectional cam 19 pinned to the intermittent shaft 20. Connection between the cam 19 and the shaft 16 is through a clutch, later described. A shutter of a conventional type may be conveniently operated from the shaft 22 through gears not shown, the shaft 22 being driven by a gear 23 meshing with a suitable gear 24 upon the shaft 20. To the forward end of the shaft 20 is splined a clutch collar 25 which includes the groove 26 in which the clutch fingers 27' operate. The collar 25 terminates forwardly in the serrated teeth 27 which mesh with the serrated teeth 28 attached to the rearward face of the gear 29.

The take-up sprocket 32 is mounted similarly to the supply sprocket 2 upon the shaft 33 supported in the bearing 34 attached to the main frame F, such shaft being supported at its left hand end, as viewed in Figure 6, by the bracket 35. Loosely mounted upon the shaft 33 is the spiral gear 36 to the inward or right hand face of which, as viewed in Figure 6, are attached the serrated teeth 37 which engage with the serrated teeth upon the collar 38 which is mounted upon the shaft 33 for longitudinal movement relative thereto and rotational movement therewith. The collar 38 includes a groove 39 with which the clutch fingers 40 cooperate. The gear 36 may cooperate with an appropriate gear 41 attached to the lower end of the shaft 12 and driving such shaft. Power is applied to the gear 36 by the shaft 43 through the gears 44 and 45, the gear 44 being pinned to the shaft 43 and the gear 45 being pinned to the gear 36. The shaft 43 may be an extension of the armature shaft of the motor M, or may be suitably attached thereto. Power is applied to the gear 29 and the intermittent shaft 20 through the gear 46, supported as in the bearing 47, and the gear 48, attached to the main power shaft 43.

By reason of such construction, it will be evident that when power is applied to the motor, and the clutch fingers 10, 27 and 40 are in operative position, as shown in the drawings, the sprockets will be concurrently revolved, the sprockets 2 and 32 moving continuously and the sprocket 15 moving intermittently. Mechanism to operate such clutch fingers is not shown, since it forms no part of the present invention. Such mechanism may be that shown in the copending applications to which reference has been made, or it may be of any desired construction.

In order to retain the film in proper operative relation with the feeding sprockets the idlers 49 and 50 (Figure 1) may be provided, mounted in brackets which are respectively supported by the shafts 51 and 52 which are operated by the arms 53 and 54, such arms being controlled in any desired manner, as, for example, that shown in the copending applications to which reference has above been made. The shoe 55 may be utilized to maintain the film in operative relation with the intermittent sprocket 15.

For producing the desired loop of slack in the film for cooperation with the feeding members the following mechanism may be employed:

There is mounted in the brackets 61 and 62 attached to any convenient portions of the main frame F, the loop producing operating shaft 63, to the upward end of which is pinned the button K for convenient manual operation. Pinned to such shaft 63, is an appropriate gear 64 which is adapted to cooperate with a suitable gear 65 mounted upon the rearward end of the shaft 66 which is supported in the bearing 67 attached to the rear of the main frame F and terminating forwardly in the gear 68 which meshes with an appropriate gear 69 which is pinned to the supply sprocket shaft 3. As is clearly shown in Figure 7, mounted upon the shaft 3, is the collar 70, which is permitted longitudinal movement by the spline 71 but rotates with the shaft. Mounted loosely upon such collar 70 is the clutch collar 72, longitudinal movement to the right, as viewed in Figure 7, being prevented by the spring wire 73 placed in a suitable groove cut in the collar 70. Mounted upon the collar 72 by the pin 73' is the pawl 78 which cooperates with teeth 79 cut upon the collar 70, the pawl 78 being forced downwardly, as viewed in Figure 8, by the light spring 80.

To operate the intermittent sprocket 15 for the purpose of producing a loop in the film, a somewhat similar mechanism may be employed.

The gear 84 is pinned to the shaft 63 and cooperates with a suitable gear 85 pinned to the right hand end of the inner portion of the shaft 86, as viewed in Figure 2, which shaft is supported by the bearing 87 attached to the rear of the main frame F. At its left hand end, as viewed in Figure 2, the shaft 86 carries the gear 88 which cooperates with a suitable gear 89 attached to the shaft 16, which is in line with the shaft 90, to which the star wheel 18 is fixed. For longitudinal movement relative to the intermittent sprocket shaft 16 and rotational movement therewith, there is provided the collar 91 which terminates in serrated teeth for cooperation with the serrated teeth upon the collar 92 pinned to the shaft 90. Cooperating with the groove 93 in such collar 91 are the fingers 94 attached to the yoke 95, supported in the bearing 96 attached to the main frame F, and operated by the lever 97 attached thereto and pivotally attached to the control rod 98 which is operated by the plate 99 which is supported by the bracket 100 attached to the frame F. To the right hand end of such plate 99, as viewed in Figure 2, are attached the fingers 101 which cooperate with the groove 102 in the collar 103 which is pinned to the loop producing shaft 63.

The left hand extension of the upper portion of the plate 99, as viewed in Figure 2, terminates in a downwardly pointed wedge which cooperates with the arms 104 pivoted upon the pin 105 supported by the bracket 106 attached to the frame F. To the left, as viewed in Figure 2, the arms 104 terminate in suitably lined clutch surfaces 107 which surround the shaft 12. The spring 108 normally forces such surfaces apart and out of contact with such shaft 12.

To control the movement of the loop producing shaft 63, the mechanism which is clearly shown in Figures 2, 3, 4, and 5 may be provided. Such mechanism per se is described and claimed in the co-pending application of Frederick Davenport Sweet, Serial Number 386,978, filed August 19, 1929.

Supported as by the bracket 110 is the hollow collar 111 through which the loop producing shaft 63 passes. Mounted within such collar 111, is the control member 112, one end of the flat spring 113 being attached to such control member 112 and the other end of such spring being attached to the inside of the collar 111. The cap 114 is attached to the top of the collar 111, and serves to confine the member 112. The pin 115 is attached to the shaft 63 and moves longitudinally in the slot 116 in the cap 114 and rotationally in the slot 117 of the member 112. Mounted below and attached to the collar 111 is the sleeve 119. The pin 120 attached to the shaft 63 and working in the slot 121 in such sleeve 119 permits longitudinal movement of the shaft 63 relative to the sleeve 119 but prevents rotation therebetween. Surrounding the sleeve 119 is the coiled spring 123, one end of which is attached to the bracket 110, which permits the rotation of the sleeve 119 and the shaft 63 in one direction only. Attached to the member 112 is the pin 125 which operates in the slot 126 cut in the collar 111, such slot terminating in the abutting surface 127.

To the lower end of the loop producing shaft 63 is pivotally attached the switch arm 130 which rocks upon the pin 131 and operates the switch 132.

The spring 135 is coiled about the control shaft 63 and confined by the collar 136 and the bracket 62.

In circuit with the light source L a fixed resistance 136 is provided, and a switch 137 for convenience is placed in the main power line of the apparatus. See Figure 9.

The operation of the apparatus is as follows:

The user places a film in operative contact with the sprockets 2, 15, and 32, either laterally or by propelling a free end of the film to the various sprockets, as described, for example, in the previously mentioned co-pending application of the said Sweet and myself.

The user then depresses the button K and shaft 63 against the pressure of the spring 135 thus placing the gear 64 in contact with the gear 65 and the gear 84 in contact with the gear 85. He thereupon turns the button and the shaft 63 in a clockwise direction, as viewed in Figure 4. The depression of the shaft 63 has moved the pin 115 through the slot 116 from the position shown in dotted line in Figure 3 to the position shown in full lines. The user thereupon moves the button K in a clockwise direction, as viewed in Figures 4 and 5, rotating the pin 115 through the slot 117 until it comes into contact with the abutting portion 124 of the member 112, at the end of such slot 117, as can clearly be seen from Figure 4. At that point, the member 112 is moved by the pin 115, and the pin 125 attached to such member 112 moved through the slot 126 from the full line position to the dotted line position of Figure 4, at which point it abuts against the surface 127 of the collar 111 thus preventing further movement.

The gear 64 meshing with the gear 65 rotates the shaft 66, the pawl 78 moving over the teeth 79 of the collar 70. The downward movement of the control shaft 63, through the collar 103 and the members 99, 98, 97, 95 and 94, has moved the collar 91 to the right, as viewed in Figure 6, thus separating the teeth upon the collar 91 from those upon the collar 92 and entirely disconnecting the intermittent shaft 16 from the shaft 90 and the star 18 and cam 19 which are adapted normally to move it intermittently. Thereupon the rotation of the shaft 86 rotates the shaft 16 and the sprocket 15. The ratio of the gears 64 and 65, and of the gears 84 and 85, is such that the sprocket 2 is rotated at twice the speed of the sprocket 15. Thus through any given rotation of the shaft 63 twice the length of film is fed from the supply reel by the sprocket 2 as is fed from the film delivered thereto by the sprocket 15. Since the locking clutch 107 by the downward movement of the shaft 63 has been moved to operative position, the shaft 12 and consequently the take-up sprocket 32 are held absolutely immovable so that there is no possibility of accidental movement of the sprocket 32. The entry of the downwardly pointed wedge of the member 99 between the pivoted arms 104 separates the portions to the right of the pivot 105, as viewed in Figure 2, and thus brings the clutching surface 107 into locking engagement with the shaft 12 thus preventing accidental movement of it and of the various members in operative connection therewith, including the star 18 and the cam 19. It will thus be seen that by the revolution of the shaft 63, one loop of slack is produced in the film between the sprockets 2 and 15 and another between the sprockets 15 and 32, such loops being necessarily of identic size. In the apparatus which is shown herein for purposes of illustration only, one revolution of the shaft 63 produces four revolutions of the sprocket 2 and two revolutions of the sprocket 15 but any desired ratio between the movement of the shaft 63 and the sprockets may be utilized, in accordance with the type or size of film which is being used or the size of the sprockets.

The downward movement of the rod 63 has likewise been effective to have thrown the switch 132 thereby breaking the circuit to the motor M and placing the fixed resistance 136 in circuit with the light source L, as will clearly be seen by reference to Figure 9. Thus the motor has been made inoperative, and interference between the regular feeding mechanism and the loop producing mechanism prevented, and the brilliance and hence the heat of the light L projected upon the film reduced, thus protecting the film from injury. If desired, a heat shield of the type described in my copending applications to which reference has previously been made may be utilized.

At the conclusion of one complete rotation of the shaft 63, further rotation in a forward direction is prevented by the contact of the pin 125 with the abutment 127 of the collar 111. If the user attempts to move the button K and the shaft 63 backwardly at this or any other stage of its operation, the collar 119 is immediately seized by the spring 123 and such backward movement immediately prevented. Consequently all that the user can do is to move the rod upwardly, or permit its upward movement by means of the spring 135. When the rod 63 is thus moved upwardly, the switch 132 will be returned to the position shown in Figure 9, the motor reactuated, and the current for the light source L will proceed around the resistance 136 and through the direct path, thus restoring normal brilliance. The upward movement of the shaft 63 will likewise serve to permit the separation of the clutch surfaces 107, urged by the spring 108, and to permit the clutch for the intermittent sprocket 15, urged by the spring 135, to resume the operative position as shown in Figure 6. The spring 113 will re-set the member 112.

When the motor again becomes operative to drive the feeding members, the pawl 78 in cooperation with the toothed collar 70 will drive the spindle 3, the other sprockets being driven through their respective clutches. It will readily be understood that in no manner can the operation of this loop producing mechanism destroy the timing between the various feeding members or between the intermittent sprocket 15 and the mechanism adapted to drive it intermittently, or between the "frame" line of the film and the aperture of the gate. Movement of the loop producing shaft 63 is possible only in one direction and, as has been explained above, movement of such shaft is limited to that which produces exactly complete revolutions of the supply sprocket and the intermittent sprocket, the take-up sprocket being locked against any movement whatever. It will also be understood that the locking clutch operating upon the shaft 12 prevents the accidental movement of the intermittent feeding mechanism while such mechanism is de-clutched from the intermittent sprocket. If the user attempts to operate the loop producing mechanism during the normal, powered operation of the apparatus, the power is immediately shut off so that no damage can be done. If during the operation of the apparatus, the user should notice that the loops are being "lost", through poorly made patches, enlarged or torn perforations, or other causes, he can immediately depress the button K and instantly reform the loops without placing any strain on the film. After the loops have been reformed, the powered feeding operation will be immediately and automatically resumed. The loops so formed in some cases will be larger than usual, but they serve to permit the continued operation of the apparatus without danger to the film.

It will be readily understood by those skilled in the art that, if desired, apparatus according to the present invention may be controlled automatically as shown in my copending applications to which reference has been made above or in that of Frederick Davenport Sweet and myself, Serial Number 352,525, filed April 4, 1929, or in that of Barton Allen Proctor, Serial Number 54,910, filed September 8, 1925. It will also be understood that, if desired, the intermittent sprocket, in accordance with the present invention, may be operated continuously during the loop forming operation, when such loop forming operation is carried out in accordance with the sequential methods of the above mentioned applications. Such operation results in slightly more accurately formed loops.

Certain of the advantages of the present invention have been stated above or are obvious from the above portion of this specification. Other advantages arise from the provision of an inexpensive, accurate, and efficient automatic loop producing method and apparatus. Other advantages arise from the provision of safeguards making it impossible for the user to bring the loop forming mechanism into operation during the powered feeding operation. Other advantages arise from the provision of means whereby a feeding member, normally continuously operable, and a feeding member, normally intermittently operable, may both be operated continuously, and concurrently operated at different rates of speed. Further advantages arise from the provision of a plurality of driving mechanisms for the successive operation of the same feeding members and of different of the same members, and means whereby the desired relation between said members and said driving mechanisms, and between each of said members and the others thereof, is always maintained. Further advantages arise from the provision of manual and powered film feeding means and control mechanism whereby only one of the same can be operated at one time.

I claim:

1. In a film handling apparatus, a first feeding member, means for continuously operating said first member, a second feeding member, means for intermittently operating said second feeding member, a third feeding member, means for continuously operating said third member, and means for producing slack in the film between said first and second members and between said second and third members, said slack producing means comprising mechanism operatively connected with all of said members and so constructed and arranged as to operate said first member and said second concurrently, said first member being so operated at a number of revolutions per minute substantially twice that at which said second member is so operated, and to maintain said means for operating said second member intermittently without effect thereupon and said means for operating said third member continuously without effect thereupon.

2. In a film handling apparatus, a first feeding member, a first mechanism for continuously operating said first member, a second mechanism for continuously operating said first member, a second feeding member, a mechanism for intermittently operating said second member, a mechanism for continuously operating said second member, and operating means interlocking all of said mechanisms and so constructed and arranged as either to operate concurrently said first mechanism for operating said first member and said mechanism for operating said second member continuously each at a rate of speed differing from that at which the other is operated or to operate said other two mechanisms concurrently at the same number of cycles per minute.

3. In a film handling apparatus, a first feeding member, means for continuously operating said first member, a second feeding member, mechanism for intermittently operating said second member, means for continuously operating said second member, a third feeding member, means for locking said third member and said intermittent operating mechanism against movement, and actuating mechanism interlocking all of said means and effective for operating each of the same in timed relation to the operation of the others thereof.

4. In a film handling apparatus, a first feeding member, means for continuously operating said first member, a second feeding member, means for intermittently operating said second member, means for continuously operating said second member, a third feeding member, mechanism for locking said third member and said intermittent operating means against movement, means for moving said locking means to operative position, means for moving said locking means to inoperative position, and actuating mechanism interlocking all of said means and effective for operating each of the same in sequential relation to the operation of the others thereof.

5. In a film handling apparatus, three feeding members adapted to engage the same film at the same time, means for operating the first of said members at a pre-determined number of revolutions per minute, means for operating the second of said members at a number of revolutions per minute less than the number of revolutions per minute at which said first mentioned member is operated, means necessarily effective for maintaining the third of said members motionless during such operation of said first and second members, means for operating all of said members concurrently at the same number of revolutions per minute, and control mechanism interlocking all of said means and so constructed and arranged that first said three means first above mentioned are operated concurrently and thereafter said three means are rendered inoperative and said fourth mentioned means is rendered operative.

6. In a film handling apparatus, a plurality of feeding members, a first driving mechanism for said members for driving a first feeding member forwardly more than the following member whereby slack is produced in a film in engagement therewith, a second driving mechanism for said members so constructed and arranged as to operate said members at the same number of revolutions per minute whereby the film is subjected to normal feeding movement, a source of power for said second mechanism, manual means for operating said first mechanism, and a connection between said manual means and said source of power so arranged that when said manual means is moved to operative position said source of power is rendered inoperable.

7. In a film handling apparatus, a plurality of members adapted to engage a film for feeding the same, a first mechanism for driving said members, control means for governing said mechanism for necessarily rendering said mechanism inoperative after a predetermined amount of movement, a second mechanism for driving said members for an indefinite period, and control means interlocking said mechanisms and necessarily effective for rendering said second mechanism operative at the conclusion of such predetermined movement.

8. In a film handling apparatus, a source for directing light upon a film, means for feeding the film, means for producing slack in the film for cooperation with said feeding means, means for reducing the current reaching said source, and interlocked actuating means for said slack producing and said current reducing means.

9. In a film handling apparatus, a member for feeding a film, a source for directing light upon the film so fed, means for producing slack in the film for cooperation with said feeding member, means for reducing the current reaching said source, and sequential control mechanism interlocking said means and including devices for rendering said current reducing means operative prior to the operation of said slack producing means.

10. In a film handling apparatus, a member for feeding a film, a source for directing light upon the film so fed, means for reducing the current reaching said source, powered means for driving said member, manual means movable into or from a position wherein it is operable for driving said member, and an operating connection between said current reducing means, said powered means, and said manual means, the movement of said manual means into such position being effective for rendering said current reducing means operative and said powered means inoperative, and the movement thereof from such position being effective for rendering said current reducing means inoperative and such powered means operative.

11. In a film handling apparatus, a member for feeding a film, a source for directing light upon the film so fed, means for reducing the light from said source reaching the film, a revoluble element for driving said feeding member, a handle movable to or from a position wherein it is operatively connected with said element for driving said member, and an operating connection between said light reducing means and said handle for maintaining said light reducing means in operative position while said handle is disposed in such position.

12. In a film handling apparatus, a feeding member, mechanism for operating said member intermittently, mechanism for operating said member continuously, means for placing one or the other of said mechanisms in operative relation with said member, and means operatively connected with said previously mentioned member and necessarily effective for locking said intermittent operating mechanism against movement while said continuous operating mechanism is in operative relation with said member.

13. In a film handling apparatus, a feeding member, a first driving means, a control device associated with said first driving means for stopping the operation of said first means after driving said member continuously for a pre-determined number of revolutions, a second means for driving said member intermittently in the same direction as that in which it was driven by said first driving means for an indefinite number of revolutions, and sequential control mechanism interlocking said means and necessarily effective for actuating said second means at the termination of the operation of said first means for such pre-determined number of revolutions.

14. In a film handling apparatus, a feeding member, mechanism for operating said member intermittently, mechanism for operating said member continuously, a motor for driving said intermittent operating mechanism, a switch for said motor, and an operating connection between said switch and said continuous mechanism for moving said switch to circuit breaking position in timed relation to the initiation of operation of said continuous mechanism.

15. In a film handling apparatus, a feeding member, mechanism for operating said member intermittently, mechanism for operating said member continuously, a motor for driving said intermittent operating mechanism, a switch for said motor, and an operating connection between said switch and said continuous mechanism for moving said switch to circuit closing position in timed relation to the conclusion of the operation of said continuous mechanism.

16. In a film handling apparatus, a feeding member, mechanism for operating said member intermittently, mechanism for operating said member continuously, a motor for driving said intermittent operating mechanism, means interlocking said mechanisms and effective for alternatingly placing each of said mechanisms in operative relation with said member, and an operating connection between said means and the circuit of said motor whereby said circuit is necessarily broken during the operation of said continuous mechanism.

17. In a film handling apparatus, a feeding member, means for driving said member continuously in a film feeding direction, means for driving said member intermittently for an indefinite number of cycles in a film feeding direction, and mechanism governing said continuous driving means and restricting the operation thereof to a pre-determined number of cycles.

18. In a film handling apparatus, a film feeding member, means for manually operating said member a predetermined amount, means for operating said member thereafter by a source of power, and control mechanism interlocking said means and necessarily effective for rendering said powered means effective to operate said member upon the completion of the operation of said manual operating means.

19. In a film handling apparatus, two spaced supporting members between which a film extends, a feeding member disposed between said supporting members for advancing the film from one of said supporting members toward the other, a motor for driving said feeding member, manually operable means for driving said member, and control means connected to said motor and means for rendering said motor automatically operative after said member has been operated by said means for a pre-determined number of cycles.

20. In a film handling apparatus, two film supporting members between which a film extends, a film feeding member disposed between said supporting members in engagement with the film for advancing the film from one of said members toward the other, a motor for driving said member, a clutch for connecting said motor and said member, manual means movable to or from a position wherein it drives said member, and a connection between said clutch and said manual means for maintaining said clutch in operation while said manual means is disposed in such driving position.

21. In a film handling apparatus, a member for feeding a film, means for producing a loop of slack in the film for cooperation with said member, a motor for driving said member, and means operated by said loop producing means for controlling the operation of said motor.

22. In a film handling apparatus, a feeding member, means for forming a loop of slack in the film for cooperation with said member, a motor for driving said feeding member, a switch for said motor, and sequential control mechanism interlocking said loop forming means and said switch and necessarily effective for moving said switch to circuit breaking position prior to the operation of said loop forming means.

23. In a film handling apparatus, a feeding member, means for forming a loop of slack in the film for cooperation with said member, a motor for driving said feeding member, a switch for said motor, and control mechanism interlocking said loop forming means and said switch and necessarily effective for moving said switch to circuit closing position after the completion of operation of said loop forming means.

24. In a film handling apparatus, a feeding member, means for forming a loop of slack in the film for cooperation with said member, a motor for driving said member, a circuit for said motor, and control means interlocking said circuit and said loop forming means to maintain said circuit inoperative during the operation of said loop forming means.

25. In a film handling apparatus, a feeding member, means operable for driving said feeding member continuously in a given direction, means for operating said feeding member intermittently in the same direction, and mechanism interlocking said means and necessarily effective for rendering one of said means inoperative before the other thereof can be operated.

26. In a film handling apparatus, two film supporting members between which a film extends, a feeding member disposed between said supporting members and engaging the film between said members for advancing the film from one of said members toward the other, manually operable means for driving said member continuously, said manual means being mounted upon said apparatus and releasable from driving engagement with said feeding member, alternative and separate means including a motor mounted upon said apparatus for driving said member intermittently, and mechanism operated by release of said manual means for actuating said motor means.

27. In a film handling apparatus, means for producing slack in a film, a light source for directing light upon the film, a circuit for said light source, and means operatively connected to said slack producing means and to said circuit and necessarily effective to reduce the current reaching said light source from said circuit while said slack producing means is in operation.

28. In a film handling apparatus, a feeding member, mechanism for driving said member intermittently, means for disconnecting said feeding member from said intermittent driving mechanism, and means mounted upon said apparatus for locking said intermittent driving mechanism against movement while it is disconnected from said feeding member.

29. In a film handling apparatus, a first film feeding member, a second film feeding member, said first and second feeding members being so disposed as to engage the same film at the same time for advancing it, a first means for driving both of said members continuously, a second means including a prime mover for driving said first member continuously and said second member intermittently in the same direction as that in which said members are driven by said first feeding means, and means interlocking said first means and said second means for rendering said first and second means alternatively operable upon said feeding members.

30. In a film handling apparatus, three feeding members consecutively arranged and engaging the same film for advancing it in a feeding direction, and driving means interconnecting all of said members for operating all of the same simultaneously and during the same length of time and in a feeding direction, said driving means including devices for first operating said first feeding member at a peripheral speed greater than that of said second feeding member and devices for operating said second feeding member in a feeding direction at a peripheral speed greater than that of said third feeding member whereby loops are created in those sections of the film between said first and second feeding members and second and third feeding members, and devices for thereafter driving said first, second and third feeding members in a feeding direction at the same number of revolutions per minute.

31. In a film handling apparatus, a first toothed feeding member, a second toothed feeding member, said first and second feeding members being so disposed that said second feeding member advances the film which is fed forwardly thereto by said first feeding member, mechanism for driving said first and second feeding members forwardly simultaneously and for the same length of time, said mechanism so driving said first feeding member in a feeding direction at a greater peripheral speed than that at which it drives said second feeding member whereby a loop is formed in the film between said first and second feeding members, means for disconnecting said driving mechanism from operative relation to said first and second feeding members, and devices associated with said driving mechanism for operating said disconnecting means after said mechansm has driven said feeding members a predetermined amount whereby the size of such loop is definitely predetermined.

32. In a film handling apparatus, a first toothed feeding member, a second toothed feeding member, said first and second feeding members being so disposed that said first feeding member advances film toward said second feeding member, a revoluble driving member, means interconnecting said revoluble member and said first and second feeding members for transmitting the power of said revoluble driving member to said first and second feeding members for driving said feeding members forwardly, said interconnecting means including devices for simultaneously driving said first feeding member at a greater peripheral speed than that at which said second member is driven for the same length of time whereby a loop of slack is formed in the film between said first and second members, and means associated with said revoluble member for rendering said interconnecting means inoperative upon said first and second feeding members at the conclusion of a predetermined number of revolutions of said revoluble member whereby the size of such loop is predetermined.

33. In a film handling apparatus, three consecutively arranged feeding members, a first driving mechanism for said members movable to and from a predetermined operative position relatively thereto, said first driving mechanism having means operable when said mechanism is disposed in said predetermined position for concurrently driving the first of said members at a predetermined number of revolutions per minute and having means for driving the second of said members at a number of revolutions per minute less than said predetermined number and having means for maintaining the third of said members motionless, a second and separate driving mechanism for all of said members, said second driving mechanism having means for driving all of said members concurrently at the same number of revolutions per minute for the purpose of carrying out the usual feeding operation of said apparatus, and means for operating said first mechanism including devices effective for rendering said second mechanism operative upon movement of said first mechanism from said operative position.

34. In a film handling apparatus, a plurality of feeding members consecutively arranged and engaging the same film, a first driving mechanism operatively interconnecting said members and having means for concurrently giving to each of said members a peripheral speed in the same direction greater than that of the following member whereby a loop is produced in the sections of the film between said members and in engagement therewith, a second and separate driving mechanism for driving said members at the same number of revolutions per minute whereby the film is subjected to normal feeding movement, and control means interlocking said mechanisms and effective for rendering one of the same operative while maintaining the other thereof inoperative.

35. In a film handling apparatus, a plurality of feeding members consecutively arranged and engaging the same film at the same time, a first driving mechanism operatively interconnecting said members for driving a first feeding member forwardly more than the following feeding member whereby slack is produced in the film between said members and in engagement therewith, a second and separate driving mechanism for said members for operating said members at the same number of revolutions per minute whereby the film is subjected to normal feeding movement, and control means operatively associated with said first and second mechanisms for rendering them alternatively operable upon said feeding members.

36. In a film handling apparatus, two feeding members, a first operating mechanism for both of said feeding members, said first operating mechanism being movable from and to operative relation with said feeding members and having means when in said operative relation for driving the first of said feeding members forwardly and maintaining the other motionless whereby a loop is formed in that section of the film therebetween, a second operating mechanism for both of said feeding members, said second operating mechanism being effective to drive said feeding members concurrently and in the same direction whereby the film is subjected to normal feeding movement, and a connection between said mechanisms effective upon the movement of said first mechanism from operative relation to said feeding members for rendering said second mechanism effective upon said feeding members.

37. In a film handling apparatus, a member for feeding a film, a source including an electrical circuit for directing light upon the film so fed, a resistance for said circuit, switching means for placing said resistance in said circuit and for removing it therefrom, a handle bodily movable to and from a position wherein it is operable for driving said feeding member, and an operative connection between said bodily movable handle and said switching means for operating said switching means for placing said resistance in said circuit upon the movement of said handle to such position and for operating said switching means for removing said resistance from said circuit upon the movement of said handle from such position.

38. In a film handling apparatus, a member for feeding a film, a rotatable member for driving said feeding member, a handle bodily movable from and to a position wherein it is operatively related to said rotatable member for driving said rotatable member, a source for directing light upon the film so fed, means for reducing the light from said source reaching the film, and an operating connection between said reducing means and said handle for rendering said reducing means operative upon the movement of said handle to said position wherein it is operatively connected to said rotatable member and for rendering said light reducing means inoperative upon the movement of said handle from such position.

39. In a film handling apparatus, two spaced film supporting members between which a film extends, a feeding member positioned between said supporting members and engaging the film for advancing the film from one of said supporting members toward the other, a source of power, operable means for operatively connecting said source of power and said feeding member whereby said feeding member is driven by said source of power, a manually operable mechanism connectible with said feeding member for driving the same, and devices operated by said manually operable mechanism for first rendering said connecting means inoperative and thereafter driving said feeding member.

40. In a film handling apparatus, two spaced film supporting members between which a film extends, a film feeding member disposed between said supporting members for engaging the film supported thereby and advancing the film from one of said members toward the other thereof, a source of power, means for connecting said source of power and said feeding member, and a manually operable mechanism connected with said feeding member and said connecting means and including devices for first rendering said connecting means inoperative, second limiting the operation of said feeding member, and third rendering said connecting means again operative.

41. In a film handling apparatus, two spaced film supporting members between which a film extends, a film feeding member disposed between said supporting members and engaging the film for advancing the film from one of said supporting members toward the other, a first driving mechanism, a clutch for operatively connecting said first driving mechanism and said feeding member whereby said first driving mechanism drives said feeding member, and a second and alternatively operable mechanism for driving said feeding member, said second mechanism including a rotatable and bodily movable shaft, a driving element attached to said shaft, a driven element operatively connected with said feeding member for driving the same, said driving and driven elements being so disposed that the bodily movement of said shaft in one direction brings said elements into driving relation one with the other and the rotation of said shaft transmits the power thereof from said driving element to said driven element whereby said feeding member is revolved, and a connection between said shaft and said clutch which moves said clutch to inoperative position upon the bodily movement of said shaft in such direction as to bring said driving and driven elements into operative relation one with the other whereby said feeding member can not be driven by said first mechanism while said second driving mechanism is in operative relation to said feeding member and moves said clutch to operative position upon the movement of said shaft in another direction.

42. In a film handling apparatus, two film supporting members between which a film extends, a feeding member engaging the film between said supporting members for advancing the film from one of said supporting members toward the other, powered means including a motor for driving said feeding member, and a separate and manually operable mechanism for driving said feeding member, said manual mechanism including a driving member, devices for breaking the circuit of said motor before said driving member can become effective for driving such feeding member, and devices for thereafter limiting the operation of said driving member to a predetermined amount.

43. In a film handling apparatus, two spaced film supporting members between which a film extends, a feeding member disposed therebetween for engaging the film extending between said supporting members and advancing it from one thereof toward the other, powered means including a motor for driving said feeding member, and alternative and manually operable mechanism for driving said feeding member, said manually operable mechanism including a driving member, means limiting the operation of said driving member to a predetermined amount, and means for closing the circuit of said motor after said driving means has been operated for said predetermined amount.

44. In a film handling apparatus, two spaced members for supporting a film extending therebetween, a feeding member disposed between said supporting members for engaging the film and advancing it from one of said supporting members toward the other thereof, a manually operable driving member bodily movable to a predetermined position wherein it is brought into driving relation with said film feeding member for driving said film feeding member, alternative powered means including a motor for driving said feeding member, a switch for said motor, and an operating connection between said manual driving member and said switch for moving said switch to circuit opening position upon the movment of said manual driving member to such predetermined position whereby said powered means is necessarily rendered inoperative before said manual driving member can be employed to operate said mechanism.

45. In a film handling apparatus, two spaced film supporting members between which a film extends, a feeding member disposed between said supporting members for engaging the film and advancing it from one of said supporting members toward the other, manually operable means for driving said feeding member, alternative and separate powered means including a motor for driving said feeding member, and control mechanism interlocking said powered means and said manually operable means for necessarily maintaining said motor inoperable during the operation of said manual operating means.

46. In a film handling apparatus, two spaced members for supporting a film extending therebetween, a film feeding member disposed between said supporting members for engaging the film and advancing it from one of said supporting members toward the other, powered means including a motor for driving said feeding member, manually operable means independent of said powered means for alternatively driving said feeding member, and means actuated by said manually operable means for controlling the circuit of said motor.

47. In a film handling apparatus, film feeding means, means including a motor for driving said film feeding means, mechanism for producing a loop of slack in the film for cooperation with said feeding means, and control mechanism connecting said loop forming means and the circuit of said motor, said control mechanism including devices for breaking the circuit of said motor in timed relation to the initiation of operation of said loop forming mechanism.

48. In a film handling apparatus, a first toothed feeding member, a second toothed feeding member, said first and second feeding members being so disposed that said first feeding member advances film toward said second feeding member, driving mechanism operatively interconnected with said first and second feeding members for driving said first feeding member forwardly at a greater peripheral speed than that at which it simultaneously and for the same length of time drives said second member forwardly whereby a loop of slack is formed in the film between said first and second members, and devices associated with said driving mechanism for rendering it inoperative for driving said members after a predetermined amount of such operation whereby the size of said loop is predetermined.

49. In a film handling apparatus, a film feeding member, manually operable rotatable means for driving said feeding member, said means being releasable from driving engagement with said feeding member, and control mechanism for said driving means, said control mechanism including devices for locking said driving means against rotation, devices for rendering said locking means effective upon said driving means upon a predetermined number of operations of said member, and automatic means for releasing said means from said member at the conclusion of said predetermined number of operations.

50. In a film handling apparatus, two supporting members between which a film extends, a film feeding member disposed between said supporting members for engaging the film for feeding the film from one of said supporting members toward the other, a driving member for said film feeding member bodily movable into and from a predetermined position wherein it is effective for driving said feeding member, and control means for said driving member, said control means including devices for locking said driving member in operative relation with said feeding member, and means for releasing said locking devices at the conclusion of a predetermined amount of operation of said driving member so that said driving member may then be withdrawn from operative relation with said feeding member.

51. In a film handling apparatus, a plurality of concurrently operable feeding members engaging the same film at the same time for advancing it, a first mechanism operable for driving said feeding members concurrently in a given direction, a second and separate mechanism for driving said members concurrently in the same direction as said previously stated direction, and control means associated with said two driving mechanisms, said control means including devices for limiting the operation of said first driving mechanism to a predetermined number of cycles and devices for starting the operation of said second driving mechanism upon the ending of the operation of said first driving mechanism.

52. In a film handling apparatus, two film supporting members between which a film extends, a feeding member disposed between said supporting members and engaging the film between said members for advancing the film from one of said members toward the other, manually operable means for driving said member, said manual means being mounted upon said apparatus and releasable from driving engagement with said feeding member, alternative and separate means including a motor mounted upon said apparatus for driving said member, and mechanism operated by release of said manual means for actuating said motor means.

WARREN DUNHAM FOSTER.